No. 628,011. Patented July 4, 1899.
P. O. LUTNES.
WINDMILL.
(Application filed Feb. 24, 1898.)
(No Model.) 2 Sheets—Sheet 2.
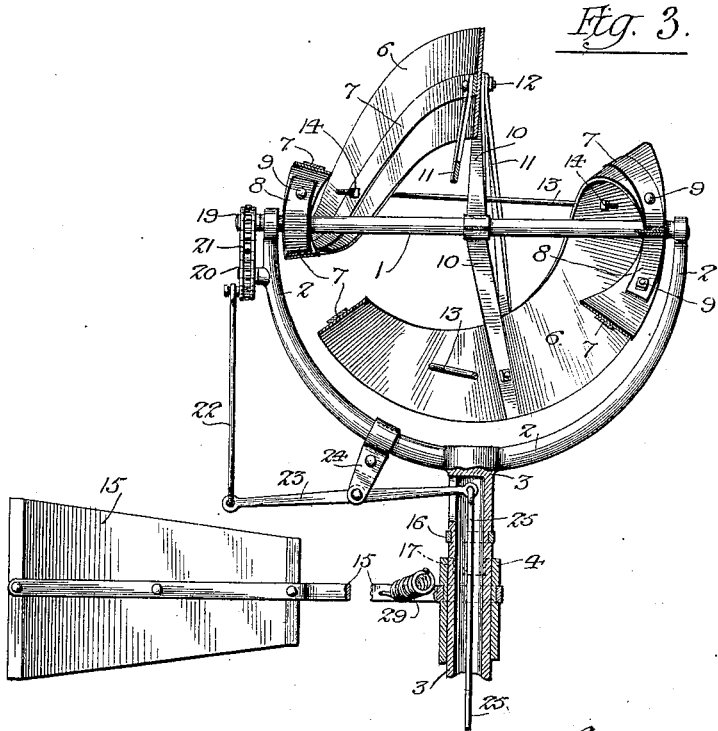
Fig. 3.
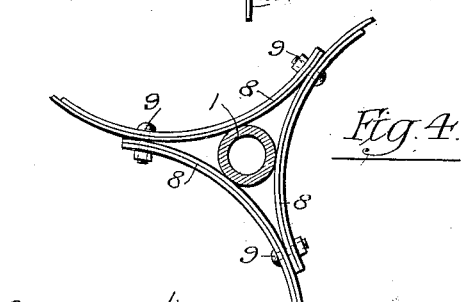
Fig. 4.
Fig. 5.
Witnesses:—
Louis M. F. Whitehead
J. F. Riley
Inventor:—
Peter O. Lutnes
By his Attorneys,
C. A. Snow & Co.

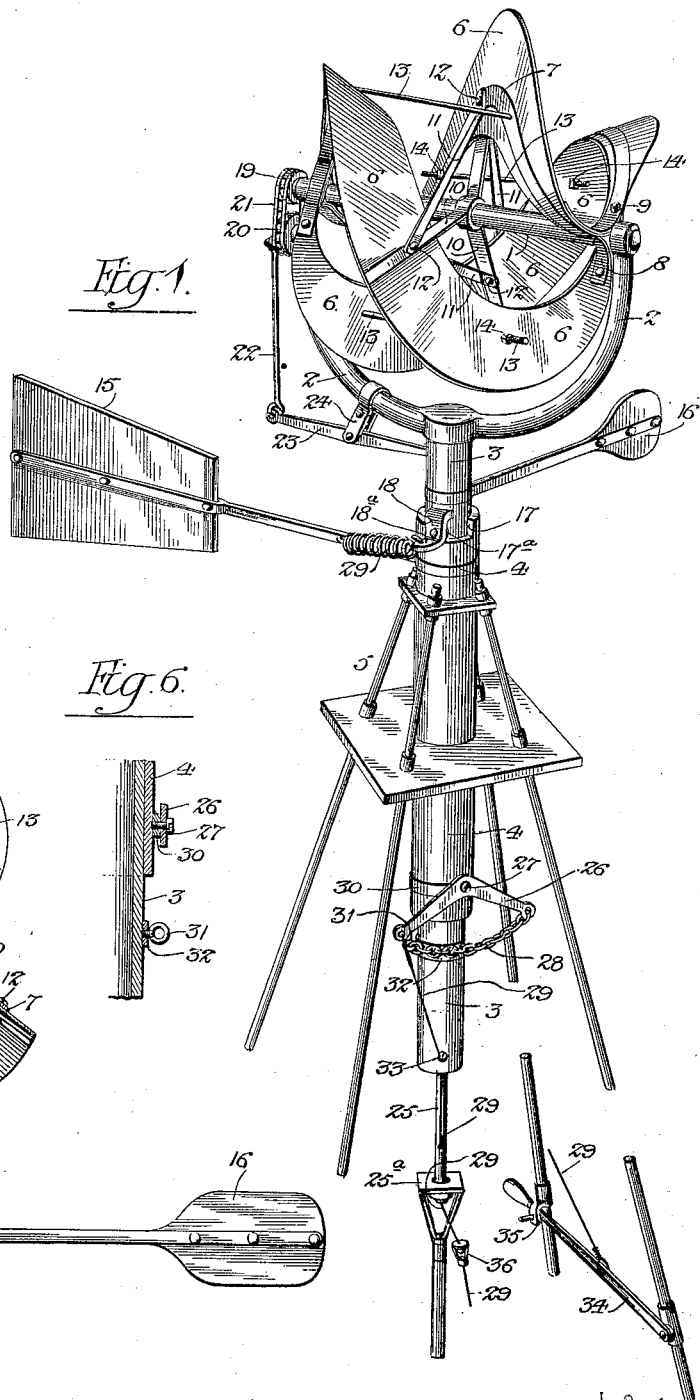

UNITED STATES PATENT OFFICE.

PETER O. LUTNES, OF WAHPETON, NORTH DAKOTA.

WINDMILL.

SPECIFICATION forming part of Letters Patent No. 628,011, dated July 4, 1899.

Application filed February 24, 1898. Serial No. 671,463. (No model.)

*To all whom it may concern:*

Be it known that I, PETER O. LUTNES, a citizen of the United States, residing at Wahpeton, in the county of Richland and State of North Dakota, have invented a new and useful Windmill, of which the following is a specification.

The invention relates to improvements in windmills.

The object of the present invention is to improve the construction of windmills, more especially the construction of wind-wheel shown and described in Patent No. 527,866, granted me October 23, 1894, and to provide simple, inexpensive, and efficient means for connecting, supporting, and bracing the wings or blades to form a light, strong, and durable wind-wheel.

A further object of the invention is to improve the construction of the means employed for governing windmills and to provide a simple device adapted to turn the windmill automatically away from the wind as the force of the latter increases and to return it similarly back to its normal position as the force of the wind abates, and thereby cause the windmill to run at a uniform speed.

The invention consists in the construction and novel combination and arrangement of parts, as hereinafter fully described, illustrated in the accompanying drawings, and pointed out in the claims hereto appended.

In the drawings, Figure 1 is a perspective view of a windmill constructed in accordance with this invention. Fig. 2 is a central vertical sectional view of the same. Fig. 3 is a similar view taken at right angles to Fig. 2. Fig. 4 is a detail view illustrating the manner of connecting the ends of the blades to the wind-wheel shaft. Fig. 5 is a detail view showing a modification of the gearing. Fig. 6 is detail sectional view illustrating the manner of mounting the bell-crank lever.

Like numerals of reference designate corresponding parts in all the figures of the drawings.

1 designates a horizontal wind-wheel shaft journaled in suitable bearings of curved arms 2, which extend upward from a tubular shank 3 and which form a semicircular bracket or frame for supporting the wind-wheel shaft and the wind-wheel. The tubular shank is journaled in a vertical bearing-tube 4, and the latter, which forms a turn-table, is journaled in suitable bearings of a tower 5 of any preferred construction.

The wind-wheel consists of three spirally-arranged wings or blades 6, disposed longitudinally of the wind-wheel shaft 1 and provided with tapering end portions which are rigidly connected with the ends of the shaft. These wings or blades, which are designed to be constructed of thin sheet metal, may be of any desired length and width and are supported and strengthened by longitudinal bracing-bars 7, which are spirally curved to conform to the configuration of the blades and secured to one of the faces of each of them. The ends 8 of the longitudinal bracing-bars are curved and extend beyond the wind-wheel shaft, as clearly illustrated in Fig. 4 of the accompanying drawings, and are connected together by bolts 9, forming a substantially triangular frame and presenting convex faces to the wind-wheel shaft. The curved ends 8 possess sufficient resiliency to bind against the nuts of the bolts 9 and prevent them from accidentally unscrewing.

The blades are supported at their centers by spokes 10, extending from the center of the wind-wheel shaft and disposed at right angles to the same, and the outer portions of the spokes extend across one of the faces of each blade, the longitudinal brace 7 being on one face of the same and the spoke being located on the other face thereof. The blades are further supported by transverse bracing-rods 11, arranged in the form of a triangle and secured to the centers of the blades by bolts 12, which pass through the spokes and the longitudinal bracing-bars 7. These transverse bracing-rods, which extend around the horizontal wind-wheel shaft, maintain the blades in proper relation to each other and prevent them from spreading and becoming bent out of shape when subjected to a heavy wind.

The end portions of the blades are expanded or strained to the desired tension by rods 13, which pass through perforations of the blades and the bracing-bars 7 thereof and have their ends threaded and receiving nuts 14, disposed on the outer faces of the blades. By rotating the nuts the blades may be strained to any desired tension, and by this construction any looseness of the parts may be corrected.

The wind-wheel is maintained in the wind by a vane 15, extending outward horizontally from the outer tube or turn-table 4 and located at a point below the curved arms 2, and in order to throw the wind-wheel out of the wind and expose less of the surfaces of the blades or wings when the force of the wind increases a supplemental governing vane or blade 16 is fixed to the inner tube or shank 3 and is normally arranged at right angles to the vane 15. The outer tube 4 is provided at its upper edges with opposite recesses 17, forming vertical walls or shoulders to limit the rotation of the inner tube 3 and providing horizontal edges to receive rollers 17ª of brackets 18, which are substantially L-shaped and which are located at opposite sides of the inner tube 3. One of the brackets 18 is provided with a horizontal extension 18ª and has attached to it a coiled spring 29, which is connected with the vane 15 and is adapted to maintain the same normally at right angles to the wind-wheel for holding the same into the wind; but when the force of the wind increases and exceeds the power of the spring the vane is adapted to swing around to a position at right angles to its normal position, so as to hold the side of the wind-wheel to the wind, thereby stopping the windmill. As soon as the force of the wind abates and becomes less than that of the spring the latter will return the vane to its normal position and throw the windmill into the wind, starting the same.

The windmill is governed automatically by the spring, and the wind-wheel is turned more or less out of the wind, according to the power of the same, so that the windmill operates at a uniform speed. The rollers of the brackets permit the inner tube to move freely without friction on the outer tube, and the shoulders formed by the vertical walls of the recesses serve as stops and engage the rollers. The windmill is also adapted to be controlled by hand, and a bell-crank lever 26 is fulcrumed by a screw 27 on the lower portion of the outer tube, and one arm of the bell-crank lever is connected by a chain 28 with the inner tube, the other arm having an operating wire or connection 29 attached to it. The screw 27 is mounted in a threaded perforation of a band 30 and engages the outer tube to secure the band to the same. The lower end of the chain 28 is linked into an eye of a screw 31, which is mounted in a threaded perforation of a band 32 and operates as a clamping-screw for securing the band to the inner tube.

The wire 29 or other connection passes downward from the bell-crank lever to a perforation 33 of the lower end of the inner tube, and it also passes through a swivel-joint 25ª of a rod 25, entering the upper section of the rod 25 at a point above the swivel-joint and passing out of the lower end of the rod through one side of the joint. The lower section of the rod 25 does not rotate, while the upper section oscillates with the frame of the windmill, and by arranging the operating-wire in this manner it is prevented from twisting and is not subjected to any wear incident to the movement of the parts of the joint 25ª on each other. The wire 29 then extends downward to the base of the tower and is attached to an operating-lever 34, disposed substantially horizontal, fulcrumed at one end on the tower of the windmill and having its other end shaped into a handle. When the handle end of the operating-lever is drawn downward, the bell-crank lever is operated to throw the windmill out of the wind by rotating the inner and outer tubes on each other, and the handle end of the lever is maintained in a depressed position by engaging it with a catch 35, consisting, preferably, of a hook; but any other suitable device may be employed, as will be readily understood. At a point between its ends the wire 29 is provided with a swiveled joint 36 to prevent its becoming twisted through the rotation of the windmill on the tower.

The horizontal wind-wheel shaft carries a sprocket-pinion 19, which is connected with a sprocket wheel or pinion 20 by a sprocket 21, and the wheel or pinion 20 is provided with a wrist or crank pin and is connected by a pitman 22 with one end of a lever 23. The lever 23, which is fulcrumed between its ends on a depending arm 24 of the bracket or support of the wind-wheel, has its inner end connected with a vertically-reciprocating pump-rod 25, which is housed within the inner tube; but the sprocket-gearing, which is located at one end of the wind-wheel shaft, may be connected by bevel-gearing with a vertical shaft, as illustrated in Fig. 3 of the accompanying drawings, when it is desired to provide a rotary motion for operating devices other than a pump.

The invention has the following advantages: The windmill is simple and comparatively inexpensive in construction, it is adapted to afford a maximum power for a given diameter of wind-wheel, and the blades are firmly braced and supported, so that they may be constructed of light material and be made the desired size to obtain the necessary power without liability of the windmill being injured by high winds. The device for governing the windmill is simple and inexpensive in construction and positive and reliable and automatic in its operation, and it is not liable to become broken or otherwise get out of order.

Changes in the form, proportion, and minor details of construction may be resorted to without departing from the spirit or sacrificing any of the advantages of this invention.

What I claim is—

1. In a windmill, a wind-wheel comprising a horizontal wind-wheel shaft, the spirally-twisted blades disposed longitudinally of said shaft, and the longitudinal bracing-bars secured to and conforming to the configuration of the blades, and having their ends extended beyond the shaft and forming substantially triangular frames receiving the ends of the shaft, substantially as and for the purpose described.

2. In a windmill, a wind-wheel comprising a horizontal wind-wheel shaft, a series of spirally-twisted blades disposed longitudinally of the shaft, and the longitudinal bracing-bars secured to the blades and having their ends curved and extended beyond the shaft and connected by bolts, said curved ends presenting convex faces to the shaft and being resilient, whereby the nuts of the bolts are locked against accidental unscrewing, substantially as described.

3. In a windmill, the combination of a horizontal wind-wheel shaft, a series of spirally-twisted blades arranged around the shaft, secured at their ends to the same and provided with longitudinal bracing-bars, spokes extending from the shaft at right angles to the same and connected with the blades at an intermediate point thereof, the transverse braces extending around the shaft and connected with the blades, and the tension-rods 13 arranged independently of the braces and connecting the blades, substantially as and for the purpose described.

4. In a windmill, a wind-wheel comprising a wind-wheel shaft, a series of spirally-twisted blades disposed longitudinally of the shaft, and the curved extensions projecting from the ends of the blades beyond the shaft, and connected by bolts, said curved extensions presenting convex faces to the shaft and being resilient, whereby the bolts are locked against accidental unscrewing, substantially as described.

5. In a windmill, the combination of a frame or tower, an outer tube or turn-table mounted thereon and provided with recesses, an inner tube mounted on the outer tube and provided with rollers arranged in the said recesses, a wind-wheel supported by the inner tube, a vane connected with the outer tube, and a coiled spring connecting the tubes, substantially as described.

6. In a windmill, the combination of an outer tube provided with recesses, brackets, an inner tube carrying the brackets, rollers journaled in the brackets and arranged in the recesses, a vane mounted on the outer tube, a wind-wheel carried by the inner tube, and a coiled spring connected with the vane and one of the brackets, substantially as described.

7. In a windmill, the combination of an outer tube, an inner tube adapted to rotate partially on the outer tube, a wind-wheel carried by the inner tube, a vane mounted on the outer tube, a supplemental vane carried by the inner tube and arranged at right angles to the said vane, and a coiled spring connecting the inner and outer tubes, substantially as described.

8. In a windmill, the combination of a tower, the inner and outer tubes mounted on the tower and adapted to rotate on each other, the inner tube being extended below the outer tube and provided with a guide, a wind-wheel mounted on the inner tube, a vane connected with the outer tube, a bell-crank lever fulcrumed between its ends on the outer tube, a chain passing partly around the inner tube and connected with the same and with one end of the bell-crank lever, a flexible connection attached to the other arm of the bell-crank lever and passing downward through the said guide, and operating mechanism arranged at the lower end of the flexible connection, substantially as described.

In testimony that I claim the foregoing as my own I have hereto affixed my signature in the presence of two witnesses.

PETER O. LUTNES.

Witnesses:
JOHN SHIPPAM,
GEORGE CLAUSEN.